Nov. 19, 1929.　　　　K. SHANK　　　　1,736,291
POWER TRANSMISSION DEVICE
Filed March 24, 1928
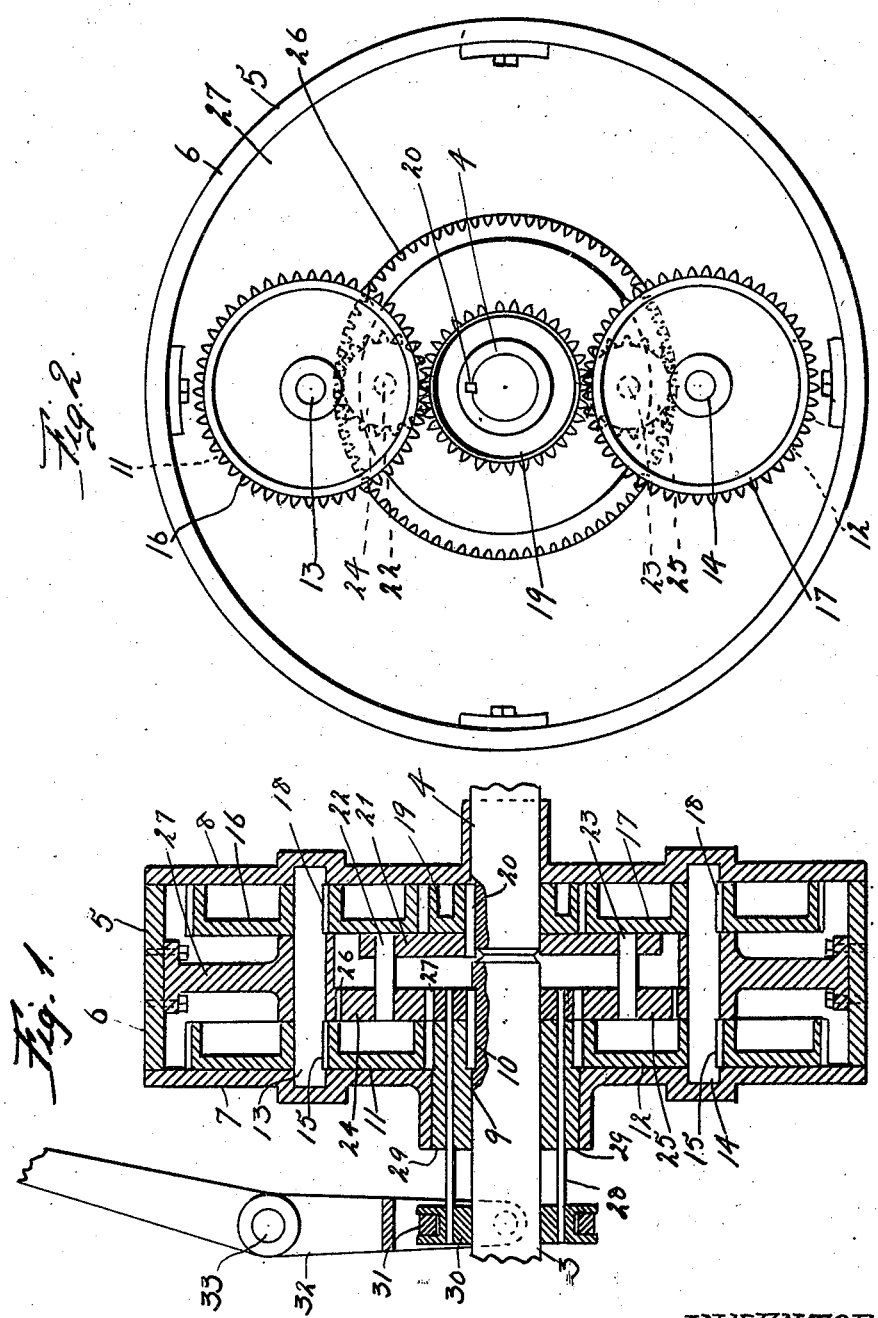

Patented Nov. 19, 1929

1,736,291

UNITED STATES PATENT OFFICE

KELLER SHANK, OF BURLINGTON, NEW JERSEY

POWER-TRANSMISSION DEVICE

Application filed March 24, 1923. Serial No. 264,299.

My invention relates to new and useful improvements in a power transmission device and one of its objects is to provide a power transmission for power propelled vehicles, which, when connected to the power unit by suitable mechanism will cause the vehicle to move forward, slowly at first, but with automatically increasing speed until full speed is attained, at which time the whole transmission mechanism rotates at the same angular velocity in the same direction as the driving shaft, thus becoming a straight through direct drive which action will continue until such time as the speed of the driving shaft is reduced.

Another object of my invention is to provide in the device a neutral position so that it will not transmit motion to the driven shaft should the latter accidentally become connected to the power unit.

A further object of the invention is to provide a pair of endwise aligned shafts, one of which is the driving shaft and the other the driven shaft and to surround the meeting ends of these with a housing in which is located certain trains of gearing comprising a pinion keyed to the driving shaft and meshing with two gears mounted on ends of diametrically located counter shafts journalled in bearings in the housing, other gears mounted on the opposite ends of the counter shafts and of less diameter than the gears on the other ends, the second mentioned gears meshing with a pinion on the driven shaft which pinion is of greater diameter than the first mentioned pinion, an internal or ring gear located between the other gears and carried by the housing, which meshes with pinions on stub axles carried by a spider keyed to the driven shaft, said last mentioned pinions, meshing with a shiftable pinion splined to the driving shaft.

With these ends in view, this invention consists in the details of construction and combination of elements hereinafter set forth and then specifically designated by the claims.

In order that those skilled in the art to which this invention appertains may understand how to use and make the same, I will describe its construction in detail, referring by numerals to the accompanying drawings forming a part of this application, in which:—

Fig. 1, is a sectional view of the power transmission device with parts left in elevation.

Fig. 2, is an end view looking from the driven end with the housing plate removed.

In carrying out my invention as herein embodied, 3 represents the driving shaft and 4 the driven shaft in endwise alignment and about the meeting ends of said shaft is located a housing 5 and here shown as comprising a circular body 6, although the shape is not essential, with both ends closed by cover plates or caps 7 and 8.

On the driving shaft 3 is keyed a pinion 9 by means of the usual key ways and a key 10, said pinion 9 meshing with two gears 11 and 12 which are keyed to the counter shafts 13 and 14 respectively at one end thereof by the usual key ways and keys 15.

The countershafts 13 and 14 are journalled in parts of the housing, as for instance, in the cover plates or caps 7 and 8 which are suitably fashioned to provide bearings therefor and on the opposite ends of these countershafts are keyed the gears 16 and 17 by means of the keys 18.

The gears 16 and 17 are of smaller diameter than the gears 11 and 12 and therefore have a less number of teeth, but both of said gears 16 and 17 mesh with a pinion 19 keyed to the driven shaft 4 by the usual key way and key 20.

The pinion 9 and gears 11 and 12 are spaced from the pinion 19 and the gears 16 and 17 and within this space is located a spider 21 which is keyed to the driven shaft 4 by a key which may be the same one that secures the pinion 19 to the driven shaft, and said spider carries stub axles 22 and 23 at diametrically opposite points and on these are journalled the pinions 24 and 25 which mesh with an internal or ring gear 26 which may be secured to the housing, as the body thereof by the web 27 through which the counter shafts 13 and 14 may pass.

In addition to meshing with the internal ring gear the pinions 24 and 25 also mesh with a shiftable pinion 27 splined on the driving shaft 3 and shiftable into and out of mesh with the pinions 24 and 25. When out of mesh with said pinions, the shiftable pinion 27 assumes a position between them and the body of the spider.

The shifting of the pinion 27 is accomplished by means of rods 28 or their equivalent projecting through holes 29 in the pinion 9 and in which they are slidably mounted with the outer ends of said rod connected to the collar 30 carried by the driving shaft with which coacts the fork 31 or an equivalent having connection with the shaft lever 32 pivoted intermediate its ends as at 33.

It is obvious from the foregoing that when the driving shaft is rotated clockwise, the driven shaft being at rest and loaded, that the pinion 27 acting through the pinions 24 and 25 on the gear 26, will cause the housing to rotate counter clockwise: the gears 11 and 12 will roll back on the pinion 9 and the gears 16 and 17 will roll back on the pinion 19.

The backward rotation of the housing is so limited, by the pinion 27 acting through pinions 24 and 25 on gear 26, that only a portion of the rotary motion transmitted, by pinion 9 through gears 11 and 12 to gears 16 and 17 can be expanded by them in rolling back on the pinion 19, the remainder being utilized in producing clockwise rotation of the pinion 19.

As the pinion 19 attains motion, the spider 21 is moved clockwise, carrying with it the pinions 24 and 25, thus reducing the motion being transmitted from pinion 27 to gear 26 and reducing the counter clockwise rotation of the housing and also reducing that portion of the rotary motion of gears 16 and 17 that is being expanded in rolling back on pinion 19 and increasing that portion of the rotary motion of the gears 16 and 17 that is being utilized in transmitting clockwise motion to the pinion 19. Thus, as the clockwise motion of the housing is reduced and likewise the rolling back of the gears 16 and 17 on said pinion 19 is reduced, while at the same time the motion transmitting action of the gears 16 and 17 on the pinion 19 is increased until the pinion 19 and the spider 21 and the pinions 24 and 25 are moving clockwise at the angular velocity of the pinion 27 at which time it becomes a direct drive.

If the pinion 27 is shifted out of mesh with pinions 24 and 25, a neutral condition is attained which permits the housing to rotate freely counter clockwise, by action of the pinion 9 on the gears 11 and 12 of the gears 16 and 17 on the pinion 19, all the rotary motion of the gears 11 and 12 and 16 and 17 then being expanded in rolling back on pinions 9 and 19 respectively.

If the direction of rotation of the driving shaft is reversed, as for instance through ordinary well known gear trains, the device will function to give a reverse motion in exactly the same manner as described in relation to the forward motion.

Of course I do not wish to be limited to the exact details of construction as herein shown, as these may be varied within the limits of the appended claims without departing from the spirit of my invention.

Having thus fully described my invention, what I claim as new and useful is:—

1. A power transmission device comprising the combination of a driving shaft, a driven shaft in endwise alignment therewith, a housing mounted on the meeting ends of said shafts, a pinion fixed to the driving shaft within the housing, gears meshing therewith and fixed to counter shafts in the housing, other gears of less pitch diameter than the first mentioned ones also mounted on the counter shafts, a pinion fixed to the driven shaft and of greater pitch diameter than the pinion on the driving shaft and meshing with the last mentioned gears, and a train of gears connected with both shafts and the housing.

2. A power transmission device comprising the combination of a driving shaft, a driven shaft in endwise alignment therewith, a housing mounted on the meeting ends of said shafts, a pinion fixed to the driving shaft within the housing, gears meshing therewith and fixed to counter shafts in the housing, other gears of less pitch diameter than the first mentioned ones also mounted on the counter shafts, a pinion fixed to the driven shaft and of greater pitch diameter than the pinion on the driving shaft and meshing with the last mentioned gears, a spider fixed to the driven shaft, stub axles carried by said spider, pinions journalled on said stub axles, a ring gear secured to the housing and meshing with the last mentioned pinions, and a shiftable pinion splined to the driving shaft and meshable with said last mentioned pinions.

In testimony whereof, I have hereunto affixed my signature.

KELLER SHANK.